United States Patent

[11] 3,626,263

[72] Inventor Maurice Graham McBride
 Barnet, England
[21] Appl. No. 17,084
[22] Filed Mar. 6, 1970
[45] Patented Dec. 7, 1971
[73] Assignee Sangamo Weston Limited
 Enfield, England
[32] Priority Oct. 7, 1969
[33] Great Britain
[31] 49,260/69

[54] ELECTRIC STEPPING MOTOR AND REMOTE REGISTER OPERATED THEREBY
6 Claims, 6 Drawing Figs.

[52] U.S. Cl. .................................................... 318/138,
 310/49
[51] Int. Cl. ................................................ H02k 37/00
[50] Field of Search .......................................... 310/49,
 172; 318/138

[56] References Cited
UNITED STATES PATENTS
3,207,935 9/1965 Mosovsky..................... 310/172

Primary Examiner—Gene Z. Rubinson
Assistant Examiner—Thomas Langer
Attorney—Young & Thompson ABSTRACT: Electric stepping motor and a remote meter register operated by a stepping motor in which the motor comprises a cylindrical permanently magnetized rotor with diametral poles of opposite polarity located between a pair of diametrically opposed main stator poles and at least one subsidiary pole forming part of a stationary flux system embraced by an operating winding for supply with stepping current pulses of alternating polarity, each subsidiary pole being more widely separated from the adjacent surfaces of the rotor than the main poles to ensure constant direction of rotation through an arc of 180° for each operating current pulse.

INVENTOR
MAURICE GRAHAM McBRIDE
By Young & Thompson
ATTYS.

3,626,263

1

ELECTRIC STEPPING MOTOR AND REMOTE REGISTER OPERATED THEREBY

This invention relates to electric stepping motors and is more particularly concerned with stepping motors suitable for operating remote registers from integrating metering means such as electric kilowatthour meters. The invention is also concerned with remote register devices incorporating such stepping motors and particularly those adapted for use as external meter registers for indicating the register reading of electric kilowatthour and other utility supply meters within buildings, particularly domestic premises.

Objects of the invention include the provision of a simplified form of stepping motor capable of easy and relatively cheap manufacture but which is adapted also to effect reliable operation of a register device, particularly one of the so-called cyclometer type, which comprises a plurality of coaxial drums provided with digital indications around their respective peripheries and adapted to be advanced stepwise one from another in the well-known way.

In accordance with one aspect of this invention an electric stepping motor comprises a rotor in the form of a cylindrical permanent magnet having one north seeking pole at one region of its periphery and a corresponding south seeking pole at a diametrically opposite region of such periphery, said rotor being mounted for rotation about the axis of the cylinder between a pair of diametrically opposed main stator poles which form part of a magnetic flux system embraced by a magnetizing winding, said magnetic flux system also including at least one further subsidiary pole disposed so as to face the surface of the aforesaid rotor at a position which is displaced by an angle of substantially 90° from the positions of the said main stator poles, the said main and subsidiary stator poles being arranged with flux gap spacings from the opposing surface of the rotor of such dimensions that the reluctance of the magnetic flux path through the magnetic flux system and said rotor by way of said subsidiary pole or poles is greater than the reluctance of the magnetic flux path through the magnetic flux system and said rotor by way of the said main stator poles.

In a preferred form of this aspect of the invention the stator flux system comprises two or three simple members of rectangular section ferromagnetic strip material shaped, as by bending, at one end to provide the required pole formation and connected towards their opposite ends to the ends of the core of a simple cylindrical form electromagnet.

According to another aspect of the invention a register device including an input drive shaft arranged to receive unit stepping movements in the form of angular rotation through 360°/x, where x is an integer greater than 2, for example, 10, is coupled to the rotor of a stepping motor as defined in the the preceding paragraph through a reduction gear having the ratio of x/2 to 1, whereby each 180° rotation of the stepping motor rotor produces an accurate unit step movement of said input shaft and thereby avoids the need for any further registration maintaining or indexing mechanism to ensure an accurately aligned output indication by the associated visual indicator means of the register.

In order that the nature of the invention may be more readily understood a number of practical embodiments of stepping motor and its manner of association with a register device will now be described by way of illustrative example only and with reference to the accompanying drawing wherein.

2

Figure 5:
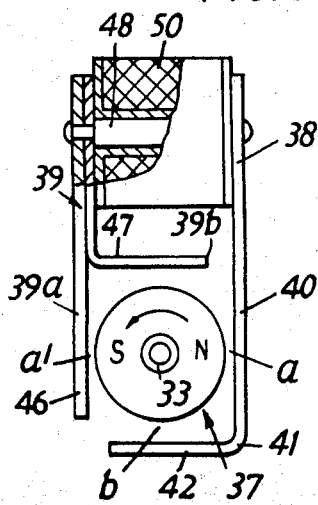
Figure 6:
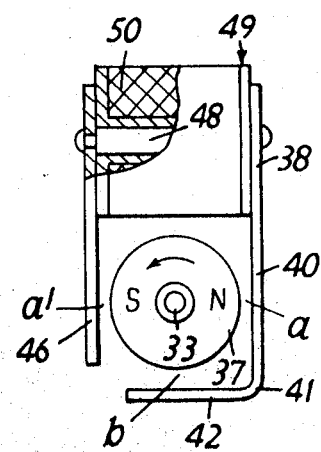

FIG. 5 is an end elevation, partly in section, showing an alternative form of stepping motor construction, while FIG. 6 is an end elevation, similar to FIG. 5, of another form of stepping motor.

The illustrated embodiments of a stepping motor are all particularly adapted for operating a remote register suitable for location in a readily accessible and visible position, e.g., outside a building, while being operated from an integrating meter device, such as an electric kilowatthour meter, located in a normally inaccessible position, e.g., within the building, and electrically connected thereto by a pair of electric conductors.

Figure 1:
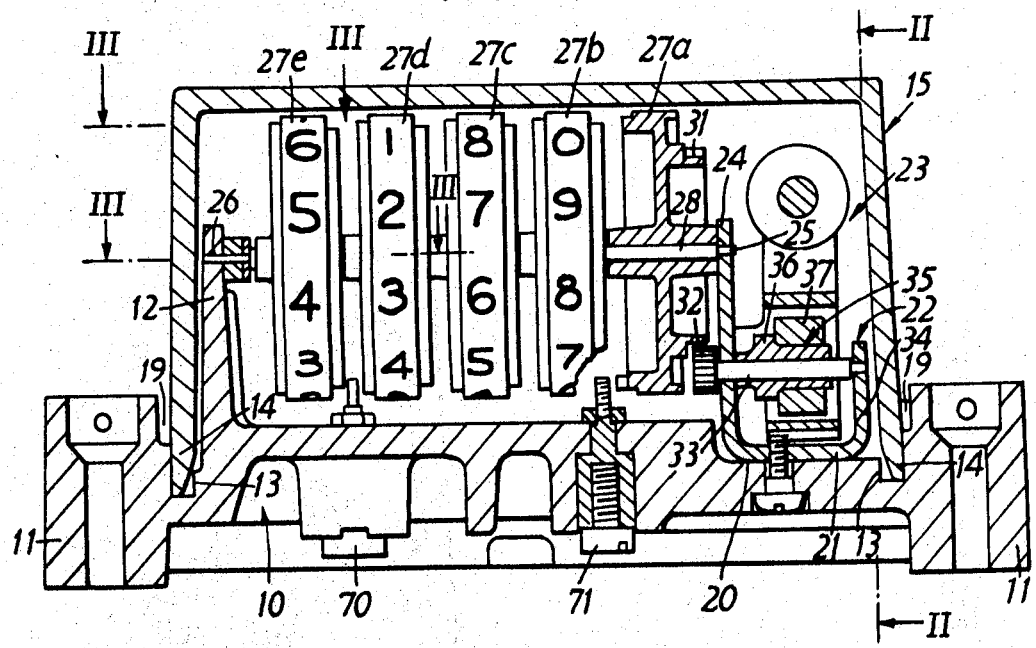
FIG. 1 is a longitudinal vertical sectional view, taken approximately on the line I—I of FIG. 2, of a remote register incorporating one form of stepping motor in accordance with the invention.
Figure 2:
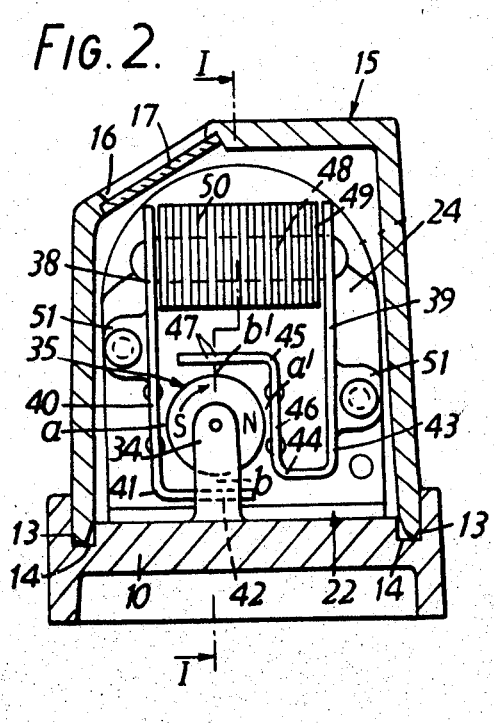
FIG. 2 is a transverse vertical sectional view, taken approximately on the line II—II of FIG. 1, of the remote register and showing the stepping motor in side elevation.
Figure 3:
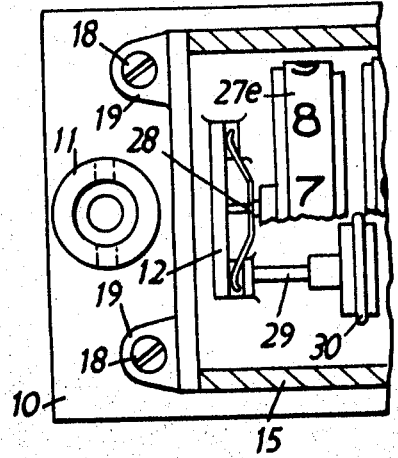
FIG. 3 is a fragmentary horizontal cross-sectional view of part of the structure of FIGS. 1 and 2, taken approximately on the line III—III of FIG. 1.

Referring more particularly to FIGS. 1, 2 and 3, the remote register device shown comprises a base plate 10 provided at each end with apertured securing lugs 11 and formed near one of its ends with an integral upstanding bearing support part 12. An approximately rectangular section recess or groove 13 in the upper surface of the base plate 10 is adapted to receive therein the marginal edge 14 of a hollow boxlike cover 15. Part of the upper region of this cover is set at an angle to the remainder and has a viewing aperture 16 therein closed by a glass window 17. The cover 15 is secured to the base plate by means of screws 18 through integral lugs 19.

Towards the end of the base plate 10 opposite that carrying the bearing support 12 is a platform surface 20 upon which is secured the midregion 21 of an approximate U-shaped plate 22 forming part of the frame structure of the stepping motor 23 to be described in detail later. The inward limb 24 of the frame plate 22 is approximately rectangular in shape, as may be seen from FIG. 2, and is provided near its upper edge with a bearing aperture 25 in alignment with another bearing aperture 26 near the top of the support part 12. A horizontal spindle 28 is mounted within the said bearing apertures and carries freely rotatable thereon five cyclometer number drums 27a, 27b, 27c , 27d and 27e each carrying digit indications 0,1 ...9 around their peripheries. A further spindle 29, parallel with the spindle 28 and also supported between the bearing support part 12 and the limb 24 of the plate 22 carries, freely rotatable thereon, the drum coupling members 30. These members 30 are of the conventional form comprising a gapped toothed gear part on one side for operation by a complementary toothed region on one drum 27a .... 27d and a pinion toothed region on the other side for driving engagement with a toothed region on the adjacent drum 27b .... 27e which is of next higher digital significance whereby, in well known manner, at the end of each complete revolution of one drum the next drum is stepped onwards by an angle of 36° to alter the digit value exposed to view through the window 17 by one.

A spur gearwheel 31 integral with the first or lowest significant digit drum 27a is in mesh with a pinion 32 rigidly secured to a shaft 33 of the stepping motor 23. This shaft 33 is rotatably mounted in the limb 24 and the other side limb 34 of the frame plate 22 which forms the stationary frame structure of the motor. Such shaft 33 has secured thereon a rotor 35 in the form of a bushing 36 supporting a short cylinder 37 of suitable permanently magnetized material. The axis of the shaft 33 coincides with the axis of the cylinder 37 and the rotor body is permanently magnetized in a diametral direction to provide a single north seeking pole N on one side of the cylindrical periphery and a complementary south seeking pole S on the diametrically opposite side of such periphery.

The rotor operates between pole members forming part of a stationary magnetic flux system. This flux system, in the embodiment of FIGS. 1, 2 and 3, comprises a first member 38 formed of a rectangular cross section strip of ferromagnetic material, e.g., mild steel, and a second member 39 of similar rectangular section strip-form ferromagnetic material. As shown more clearly in FIG. 2, the first pole member 38 is positioned so as to provide a main pole 40 having a flat main polar surface lying parallel with but separated from the facing peripheral surface of the rotor 35 by a first main pole magnetic flux gap $a$. The same pole member 38 is bent at right angles towards one end at 41 so as also to provide a subsidiary pole 42 which has a flat subsidiary polar surface likewise parallel with but separated from the facing peripheral surface of the rotor 35 by a first subsidiary pole flux gap $b$, such flux gap $b$ being at a position which is displaced by an angle of substantially 90° ahead of the gap $a$ with respect to the rotation of the rotor about its axis. The other pole member 39 is of more complex form, being bent three times at right angles, i.e., at 43, 44 and 45, so as to provide another main pole 46 having a flat main polar surface which is parallel with the first main polar surface and is separated from the facing peripheral surface of the rotor 35 by a second main pole flux gap $a1$ disposed at a position diametrically opposite to the first main pole flux gap $a$ relative to the rotor axis, and a subsidiary pole 47 having a flat subsidiary polar surface which is separated from the rotor surface by a second subsidiary pole flux gap $b1$ which is diametrically opposite the gap $b$ and hence displaced 90° ahead of the gap $a1$. Preferably the second main pole flux gap $a1$ and the second subsidiary pole flux gap $b1$ are each of substantially the same spacing dimension from the rotor surface as the respective first main pole flux gap $a$ and the first subsidiary pole flux gap $b$.

The opposite end of the strip member 38 is secured in good magnetic transfer relationship, e.g., by riveting as shown, to one end of a cylindrical core 48 of ferromagnetic material. The opposite end of such core 48 has secured thereto in good magnetic transfer relationship, e.g., by riveting as shown, the other end of the second pole member 39. A bobbin 49 of electric insulating material containing an electromagnetic coil winding 50 is provided around the core 48. The pole members 38, 39 are secured to the platelike limb 24 of the frame plate 22 by means of screws or rivets through integral lugs 51. Terminals 70, 71 carried by the base plate 10 are connected to the ends of the winding 50.

Figure 4:
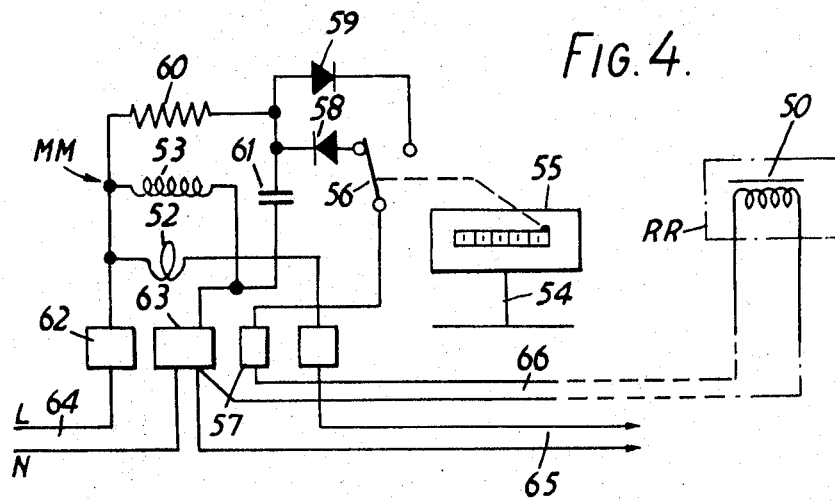
FIG. 4 is a circuit diagram showing one manner of operating a device as shown in FIGS. 1–3 as a remote register for an electric supply meter.

In the operation of this arrangement, a direct current having a first polarity is passed through the winding 50 during one stepping operation and this is followed, at the time of the next stepping operation, by the passage of a further direct current of opposite polarity through the same winding. Following stepping operations are effected in similar manner by reversal of the direction of the current flow. The applied currents are derived from switching means operated by the integrating register mechanism of the driving meter means. As shown in FIG. 4, the associated metering means MM, constituted by a conventional kilowatthour meter having a current coil 52, a voltage coil 53 and a rotor spindle 54 operating a register mechanism 55 through the usual form of reduction gearing, is provided with a cam which is operative upon a changeover switch 56 to reverse the position of the latter at the instant of completion of consumption of each kilowatthour unit. Such switch 56 operates to supply current which is alternately of opposite polarity by connecting a terminal 57 first to a rectifier 58 poled in one direction and then to a rectifier 59 poled in the opposite direction. The opposite terminals of the rectifiers are each connected to the junction between a resistance 60 and a capacitance 61 connected in series across the respective input line and neutral terminals 62, 63 which are connected to the power supply over leads 64. The metered load is connected across leads 65 while the winding 50 of the remote register RR is connected by a pair of conductors 66 across the terminals 57, 63. Thus each registration of one unit of power consumption causes the application of current of a polarity opposite to that of the last preceding current to the remote register winding 50. The voltage used for operating the remote register is derived from across the capacitance 61 rather than the resistance 60 of the voltage reducing network to protect the rectifiers from voltage spike in the waveform of the input power supply.

The applied currents can be maintained continuously with polarity reversal at the required instants by means such as those shown in FIG. 4. Alternatively the alternate polarity current applications may be in the form of shortened pulses, the remote register winding remaining unenergized during the intervening periods.

Upon application of an energizing current to the said winding 50, the main poles 40 and 46 at the main gaps $a$ and $a1$ will be forced to assume a magnetic polarity similar to that of the facing polar regions of the rotor magnet. The resultant magnetic repulsion causes the rotor to turn through 180° to a position where the immediately facing rotor and main stator poles are of unlike polarity. This rotation is always in one direction which is determined by the positioning of the subsidiary poles 42, 47 and the respective subsidiary flux gaps $b$ and $b1$, the direction of rotation being such that each rotor pole moves towards the subsidiary gap which is of unlike polarity. Thus in the case of the example shown in FIG. 2, the rotor will always move in a clockwise direction as viewed in that Figure.

To ensure that each movement step of the rotor is in one direction only and consists of movement through a full 180° arc, it is necessary that the reluctance of the magnetic flux path around the magnetic flux system and through the rotor by way of the two opposing main gaps $a$ and $a1$ is smaller than the reluctance of the magnetic flux path through the same magnetic flux system and the rotor by way of the subordinate gaps $b$ and $b1$. For an opposite direction of rotation to that shown with an arrangement resembling that of FIG. 2, the reluctance sum of the gaps $b$ and $b1$ would need to be made smaller than the reluctance sum of the gaps $a$ and $a1$. The transmission ratio of the pinion 32 to the spur gearwheel 31 is 5:1 so that each 180° movement of the rotor 35 by each operating current causes 36° movement of the first cyclometer drum 27$a$.

Discontinuance of the current supply after any operation step, whether due to failure of the current supply or the deliberate arrangement of the operating currents to be of shortened pulse form, will not result in any disturbance of the position of the rotor 35 since this will remain substantially unmoved due to the attraction which is still provided by the polar regions of the permanently magnetized rotor at the more closely facing main poles 40 and 46 across the two main gaps $a$ and $a1$. The remote indicator which is operated thereby accordingly achieves a requisite integrity of retaining a memory of the last switching operation in the event of any supply failure or accidental disconnection.

With the arrangement of the stepping motor as described in association with a cyclometer-type register providing decimal digit indications on each drum the 5:1 gear reduction ratio provided by the pinion 32 and spur gear 31 between the rotor shaft 33 and the input or first drum of the register is advantageous, firstly by increasing the power available from the motor on the register input and secondly by enhancing the accuracy of location of the register input drive at the correct digital display position at the end of each stepping operation.

FIG. 5 shows a modified construction of the motor pole members in which the equivalent of the second pole forming member 39 of FIG. 2 is in two parts 39$a$, 39$b$. Both parts are again of rectangular section ferromagnetic strip material, the part 39$a$ being straight and providing the second main pole 46 to form gap $a$ and the other part 39$b$ being bent at right angles to provide the second subordinate pole 47 and subordinate gap $b1$. Pole member 38 is as described with reference to FIG. 2.

FIG. 6 illustrates another modification in which the construction of FIG. 5 is simplified further by omitting the part 39$b$ of that figure. Two main gaps $a$ and $a1$ are provided as before but there is now only one subordinate gap $b$.

In FIGS. 5 and 6 the direction of viewing is opposite to that of FIG. 2. Other modifications will be apparent to those skilled in the art.

I claim:

1. An electric stepping motor comprising a rotor having the form of a cylindrical permanent magnet providing one north seeking pole at one region of its periphery, and a complementary south seeking pole at a diametrically opposite region of its periphery, means rotatably mounting said rotor for rotation about the cylinder axis, a stationary magnetic flux system comprising a pair of main stator poles positioned to lie on diametrically opposite sides of said rotor and at least one further subsidiary pole disposed to face the surface of said rotor at a position displaced by an angle of substantially 90° from the said main stator poles and an electromagnetic magnetizing winding embracing a part of said magnetic flux system to produce opposite magnetic polarities in said main stator poles when traversed by a magnetizing current, the magnetic reluctance of the magnetic flux path around said flux system and through said rotor by way of said subsidiary pole or poles being greater than the reluctance of the equivalent magnetic flux path around said system and through said rotor by way of said main stator poles and operative to provide an output rotary movement of one-half revolution in a given direction in response to one input pulse of a polarity and of a second-half revolution in the same given direction in response to a following input pulse of opposite polarity.

2. An electric stepping motor according to claim 1 in which said magnetic flux system comprises members of rectangular section ferromagnetic strip material shaped at one end to provide said main and subsidiary poles and connected towards their opposite ends to a core of an electromagnet.

3. An electric stepping motor according to claim 2 in which said magnetic flux system comprises a first pole member of rectangular section strip ferromagnetic material bent at right angles towards one end to form a first main pole and a first subsidiary pole and connected towards its other end to one end of said magnetic core and a second pole member of magnetic strip material reversely bent upon itself near its midregion and then again bent at right angles away from its other end to form a second main pole and a second subsidiary pole, said second pole member being connected towards its other end to the opposite end of said magnetic core.

4. An electric stepping motor according to claim 2 in which said magnetic flux system comprises a first rectangular section strip of ferromagnetic material bent at right angles towards one end and connected to one end of said magnetic core near its other end and a second unbent strip of rectangular section strip of ferromagnetic material forming the second main pole at one end and connected towards it other end to the opposite end of said magnetic core.

5. An electric stepping motor according to claim 4 in which said magnetic flux system includes a further member of rectangular section strip of ferromagnetic material bent at right angles towards one end to form a second subsidiary pole and connected towards its other end to the said other end of said magnetic core in face-to-face contact with said second strip member.

6. An electric stepping motor including a rotor comprising a cylindrical permanent magnet magnetized diametrically to have a single north pole at one region of its periphery and a single complementary south pole at a diametrically opposite region of its periphery, means rotatably mounting said rotor for rotation about the axis of said cylinder, a stationary magnetic flux system comprising a pair of main stator poles each having a flat main polar surface, which main polar surfaces lie parallel with each other on diametrically opposite sides of and with equal flux gap springs from the periphery of said rotor magnet and at least one subsidiary stator pole having a flat subsidiary polar surface lying at an angle of 90° to said main polar surfaces, said subsidiary polar surface facing but being spaced away from the periphery of said rotor magnet, and an electromagnet embracing a part of said magnetic flux system to produce, when energized, opposite magnetic polarities in said main stator poles and the same magnetic polarity in said subsidiary pole as in a given one of said main poles, the magnetic reluctance of the magnetic flux path around said magnetic flux system and through said rotor by way of said subsidiary pole or poles being greater than the corresponding reluctance of the equivalent magnetic flux path around said flux system and through said rotor by way of said main stator poles and providing an output rotary movement of one-half revolution of said rotor in a given direction in response to one input energizing current pulse of a first polarity and a second one-half revolution in the same given direction in response to a following input energizing current pulse of opposite polarity.

* * * * *